Patented Dec. 5, 1933

1,938,453

UNITED STATES PATENT OFFICE 1,938,453

MANUFACTURE OF ALIPHATIC ALCOHOLS

William J. Hale, Midland, Mich., assignor to The Dow Chemical Company, Midland, Mich., a corporation of Michigan No Drawing. Application September 4, 1928
Serial No. 303,956

8 Claims. (Cl. 260—156)

The present invention relates to processes for the manufacture of aliphatic alcohols by means of the hydrolysis of mono-substituted aliphatic hydrocarbons, and more particularly to the control of such processes whereby the formation of secondary products is prevented or repressed and the reaction is directed substantially to the formation of the principal product in maximum yield.

It is well known that the action of water upon organic halides, and other organic derivatives of inorganic acids capable of hydrolysis, leads not only to the formation of primary substituted derivatives of the water type, known as hydroxides or alcohols, but also by dehydration of such compounds to the formation of secondary substituted derivatives of the water type, known as oxides or ethers. Between such primary compounds and the corresponding secondary derivative there is a tendency toward a condition of equilibrium as shown by the following equation wherein R=univalent hydrocarbon radical:

(1) 

At elevated temperatures, and especially in the presence of metallic oxides, the tendency to dehydration and resultant ether formation is the more pronounced. The degree of concentration of any one of the components naturally is a determinate factor at any given temperature and pressure.

I have discovered that, in any given organic chemical reaction wherein one of the primary products gives rise to a secondary organic compound existing in equilibrium therewith, it is feasible to direct such reaction entirely to the preparation of the primary product by artificially establishing and maintaining within the system such concentration of the secondary derivative as is found to be formed under the conditions of the reaction.

To the accomplishment of the foregoing and related ends the invention, then, consists of the steps hereinafter fully described and particularly pointed out in the claims, the following description illustrating and setting forth in detail certain steps embodying the invention, such disclosed means constituting, however, but several of the ways in which the principle of the invention may be used.

When alkyl derivatives of inorganic acids are easily hydrolyzable at ordinary temperatures, such, for example, as is the alkyl halide, methyl bromide, there is little if any tendency toward ether formation. However, if this same hydrolysis between equimolecular proportions of methyl bromide and hydrolytic agent, such as caustic alkali, is conducted at a temperature of about 150° C. under pressure, as much as 25 per cent. of the product will appear in the form of methyl ether. The secondary substituted compound owes its formation to the tendency to dehydration of the primary substituted compound as is evidenced by the following equations

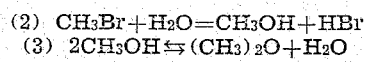

It will be understood, of course, that when both liquid and gaseous phases are present the equilibria in both states must come into consideration. In accordance with the law of mass action it becomes at once possible to drive this equilibrium backward by an increase in concentration either of the aqueous or of the alkyl ether component. The direction, therefore, of hydrolytic processes toward the highest yield of a desired end-product depends primarily upon a control of the concentration of each of the various components in the equilibria present.

I have now discovered that in such simple example as the hydrolysis of a methyl halide in a closed vessel under varying degrees of temperature and pressure, it is only necessary to add initially to the methyl halide entering the reaction that same proportional quantity of methyl ether as would otherwise be produced in the hydrolytic operation itself in order that such hydrolysis will be directed entirely to the production of the primary substituted derivative, i. e., methyl alcohol. In fact, any excess in methyl ether so introduced will be converted by hydration to methyl alcohol due to the existing equilibria forces so that a corresponding increase in yield of methyl alcohol will be obtained, over and above that derived from the hydrolysis of the methyl halide.

In an open vessel, i. e., at atmospheric pressure, the hydrolysis will be subject to these same general influences, but the ease with which a large concentration of water component can be maintained makes possible holding the concentration of alkyl ether at a minimum.

For the practice of this invention as applied to open systems it becomes necessary, therefore, to determine that concentration of alkyl ether, however small, that is possible of existence at end of the reaction in order that this same proportional quantity of said ether may be introduced into the original mixture of reacting components. By thus maintaining the concentration of such ether at its average maximum concentration throughout the course of the reaction, the hydrolysis of the organic derivative of an inorganic acid is directed entirely toward the desired alcohol.

*Example.*—One mole of ethyl chloride (64.5 gm.) together with one mole of caustic soda (40 gm.) dissolved in 360 cc. water was heated to 150° C. in a rotating bomb for three hours. At the end of the reaction the bomb was opened and the contents distilled, giving a lower fraction consisting of 1.5 gm. ethyl ether, representing a 4.1 per cent. yield of the theoretical 100 per cent. conversion of ethyl chloride to ethyl ether, or 2.4 per cent. of the weight of ethyl chloride used. The remaining portion upon fractionation yielded 43 gm. ethyl alcohol. No trace of unreacted ethyl chloride remained. In subsequent operations, therefore, to a mixture containing equimolecular equivalents of ethyl chloride and caustic soda ethyl ether is added in amount of 2.4 per cent. of the weight of ethyl chloride used. In carrying out the reaction under the same conditions described above no further formation of ethyl ether takes place, and the transformation of ethyl chloride into ethyl alcohol is substantially quantitative.

In consecutive operations the preferred procedure will be to separate the ether fraction from the reaction mixture in each operation and add the same to the ingredients of the succeeding operation. Likewise in a continuous process the ether fraction separated from the reaction products may be continuously returned to the initial stage of the process.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process for the manufacture of ethyl alcohol which comprises heating substantially equimolecular amounts of ethyl chloride and approximately 10 per cent aqueous sodium hydroxide under pressure at a temperature of about 150° C. in the presence of approximately 2.5 per cent of ethyl ether, separating ethyl alcohol from ethyl ether, and returning the latter to the initial reaction.

2. In a process for the manufacture of an aliphatic alcohol by reacting an alkyl halide with an aqueous alkaline hydrolyzing agent, wherein an alkyl ether tends to form along with the desired compound, the step which consists in restraining the formation of said alkyl ether by adding the latter to the reaction mixture.

3. In a process for the manufacture of an aliphatic alcohol by reacting an akyl halide with an aqueous solution of an alkali metal hydroxide, wherein an alkyl ether tends to form along with the desired compound, the step which consists in initially adding said alkyl ether to the reaction mixture in an amount sufficient to maintain the system in an approximate state of chemical balance with respect to said compound, whereby the formation of any substantial additional amount of such alkyl ether is prevented.

4. In a process for the manufacture of an aliphatic alcohol by reacting an alkyl chloride with an aqueous alkaline hydrolyzing agent, wherein an alkyl ether tends to form along with the desired compound, the step which consists in restraining the formation of said alkyl ether by adding the latter to the reaction mixture.

5. In a process for the manufacture of an aliphatic alcohol, the steps which consist in forming a mixture of an alkyl chloride, an aqueous alkali metal hydroxide, and an alkyl ether corresponding to said alkyl chloride, and heating the mixture under superatmospheric pressure to at least 150° C.

6. In a process for the manufacture of ethyl alcohol, the steps which consist in forming a mixture of an ethyl halide, an aqueous alkaline hydrolyzing agent, and ethyl ether, and reacting the ethyl halide with said hydrolyzing agent in the presence of the ether.

7. In a process for the manufacture of ethyl alcohol, the steps which consist in forming a mixture of ethyl chloride, an aqueous alkaline hydrolyzing agent, and ethyl ether, and reacting the ethyl chloride with said hydrolyzing agent in the presence of the ether.

8. In a process for the manufacture of ethyl alcohol, the steps which consist in forming a mixture of ethyl chloride, an aqueous alkali metal hydroxide, and ethyl ether, and heating the mixture under superatmospheric pressure to a temperature of at least 150° C.

WILLIAM J. HALE.